UNITED STATES PATENT OFFICE.

CHARLES H. SLICER, OF BALTIMORE, MARYLAND.

IMPROVEMENT IN MANUFACTURE OF PORTLAND CEMENT.

Specification forming part of Letters Patent No. 213,459, dated March 18, 1879; application filed February 18, 1879.

*To all whom it may concern:*

Be it known that I, CHARLES H. SLICER, of Baltimore city, in the State of Maryland, have invented certain new and useful Improvements in the Manufacture of Portland Cement, of which the following is a specification:

Of the hydraulic cements made in this country all are simply hydraulic limestone rock burned and ground—at least, none other are upon the market—that is to say, they are what are known as "natural" or "quick-setting" cements, while what are generally known as "Portland" cements are imported, and are used in the manufacture of artificial stone for sidewalks, steps, window-sills, lintels, &c. This is so because no cheap material has been found that could be utilized in the production of the vastly superior Portland or artificial cements, which latter are only had by importation at a cost three times greater than that of our natural cements.

The object of my invention is to produce an artificial cement equal to the imported Portland, at a very low cost—much lower than that at which the imported article is made.

In carrying out my object, I take the oyster-shells that lie waste, and which the oyster-packing houses are glad to cart to the doors of any person wanting them.

What I claim as my invention in the production of artificial cement is fully pointed out in the claim, in connection with the following description, which is sufficient to enable others skilled in the art to make and use my cement.

I take oyster-shells and reduce them to a fine powder or meal by grinding them in a disintegrating-burr or other mill. The shells in their natural state are very hard, and care should be taken to thoroughly grind or reduce them, so that the flour or meal may be bolted through a bolt or sieve of fifty or sixty or more meshes to the inch. While I may prefer to grind the shells in the raw state, I may also roast or calcine them before grinding, in order that they may be more readily reduced to fine powder or flour. It will be found just as necessary to grind them when roasted as when raw, since in no other way can the hearts or butts or hinges of the shells be reduced to sufficient fineness to answer practically the purpose of making good artificial cement, for the reason that if the shell-flour is not of uniform fineness it cannot be ultimately incorporated and mixed with clay, as is absolutely necessary in the compound for cement.

In making my Portland cement, take seventy or eighty parts of oyster-shell flour, made from raw or burned shells, to which add twenty or thirty parts of fine-ground clay containing silica in excess—say, from one and two-thirds to two and one-fourth parts silica. The clay, before being added, should be finely ground, even bolted, since the admixture will be more intimate the finer the shell and clay are ground.

After adding the clay, either in a dry or fluid state, to the shell-powder, the two are mixed well together. Water is then added, and the mass is ground or pugged thoroughly and with sufficient water to reduce it to the consistency of putty, or, even better, mixed to a creamy paste by grinding, great care being taken that the clay and oyster-shell powder have been combined or incorporated as intimately as possible, for upon the completeness of the admixture depends much of the success of producing good cement, or even cement at all.

It will be understood that when the admixture is ground to thin paste it is run into vats to settle and to somewhat dry out before being used. When the oyster-shell meal and clay have been thoroughly mixed, and the mass becomes of proper consistency, it is formed into bricks or balls, and dried upon a drying-floor or otherwise. The material is then ready for burning into cement. This is done by placing the balls or bricks in a suitable kiln, where they are burned to semi-vitrifaction or the verge of vitrifaction. This burning to semi-vitrifaction is, perhaps, of as much real vital importance as the proper compounding of the mixture, since the superior quality of the Portland cements is greatly due to the heavy or intense burning. This burning is far more intense than can be practiced in the production of natural cements, since the hydraulic rock from which the latter are made will not admit of intense burning, because they would be destroyed by intense heat.

After the burning is completed the product of the kiln, which is a dark flinty, stony mass, is ground to powder or flour in any suitable mill, and allowed to air for some days, when it is ready to be packed in barrels for use.

This cement, like all good quality of Portland, is very heavy, weighing from one hundred to one hundred and twenty pounds to the bushel.

I do not confine myself to the exact proportions stated, as those skilled in the art may vary them in accordance with the quality of materials used.

I claim—

In manufacturing cement known as "Portland" or "artificial" hydraulic cement, ground oyster-shells, raw or burned, with silicious clay, substantially as set forth.

In testimony whereof I have hereunto set my hand in the presence of two witnesses.

C. H. SLICER.

Witnesses:
A. E. H. JOHNSON,
J. W. HAMILTON JOHNSON.